(12) United States Patent
Jiménez et al.

(10) Patent No.: US 10,375,666 B2
(45) Date of Patent: Aug. 6, 2019

(54) COMMUNICATION NETWORK NODE

(71) Applicant: TELEFONAKTIEBOLAGET L M ERICSSON (PUBL), Stockholm (SE)

(72) Inventors: Jaime Jiménez, Helsinki (FI); Petri Jokela, Espoo (FI); Heikki Mahkonen, San José, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 284 days.

(21) Appl. No.: 14/910,863

(22) PCT Filed: Aug. 9, 2013

(86) PCT No.: PCT/SE2013/050960
§ 371 (c)(1),
(2) Date: Feb. 8, 2016

(87) PCT Pub. No.: WO2015/020575
PCT Pub. Date: Feb. 12, 2015

(65) Prior Publication Data
US 2016/0198430 A1 Jul. 7, 2016

(51) Int. Cl.
*H04W 24/00* (2009.01)
*H04W 64/00* (2009.01)
(Continued)

(52) U.S. Cl.
CPC .............. *H04W 64/00* (2013.01); *G01S 5/02* (2013.01); *H04L 45/7453* (2013.01);
(Continued)

(58) Field of Classification Search
None
See application file for complete search history.

(56) References Cited

U.S. PATENT DOCUMENTS 8,407,085 B1    3/2013  Wu et al.
9,127,962 B1 *  9/2015  Schirmacher .......... G06Q 30/02
(Continued)

FOREIGN PATENT DOCUMENTS

EP    2091272 A2    8/2009

OTHER PUBLICATIONS

Gaiasup, "How it works," http://portal.gaiasup.com/en/documentation/getting-started/what-gaiasup, 2012-2013.
(Continued)

*Primary Examiner* — Moustapha Diaby
(74) *Attorney, Agent, or Firm* — Patent Portfolio Builders PLLC

(57) ABSTRACT

A method performed in a node comprised in a communication network is disclosed. The method includes obtaining a set of coordinates of a coordinate system used by the communication network, which set of coordinates specifies a geographical position held by the node. The method includes obtaining a first identifier for the node. The identifier comprises at least a part of the obtained set of coordinates, where the identifier can specify to the communication network a first geographical area in which the node is positioned. The method includes uploading data to a server in the communication network, the data being associated with the obtained identifier when uploaded to the server. The first identifier specifies to the network, such as other nodes in the communication network, a geographical area in which the node is positioned/located. The geographical area may be of any size, but includes the place where the node is positioned.

1 Claim, 6 Drawing Sheets

(51) Int. Cl.
*H04W 4/021* (2018.01)
*H04L 12/743* (2013.01)
*G01S 5/02* (2010.01)
*H04W 4/38* (2018.01)
*H04W 4/70* (2018.01)

(52) U.S. Cl.
CPC ............ *H04W 4/021* (2013.01); *H04W 4/38* (2018.02); *H04W 4/70* (2018.02)

(56) References Cited

U.S. PATENT DOCUMENTS

| | | | | |
|---|---|---|---|---|
| 2005/0273258 | A1* | 12/2005 | MacNeille | G01S 5/0072 701/300 |
| 2007/0067389 | A1* | 3/2007 | Bedi | H04L 67/26 709/204 |
| 2007/0118291 | A1* | 5/2007 | Carttar | G06F 17/30241 702/5 |
| 2012/0054011 | A1* | 3/2012 | Petersen | G06Q 30/0214 705/14.16 |
| 2012/0284794 | A1* | 11/2012 | Trent | G06F 21/64 726/23 |
| 2013/0061049 | A1* | 3/2013 | Irvine | G06F 21/6218 713/165 |
| 2013/0178965 | A1* | 7/2013 | Baalu | H04L 67/303 700/94 |

OTHER PUBLICATIONS

Gaiasup, "Introduction to GaiaSup," http://portal.gaiasup.com/en/content/getting-started, 2012-2013.

International Search Report and Written Opinion dated May 15, 2014 in related International Application No. PCT/SE2013/050960.

Srinivasan, "A Distributed Pub-Sub Based Middleware Service for Configuring Multicast Areas in a Sensor Network," Thesis, May 10, 2005, University of Virginia, http://www.cs.virginia.edu/~vs8n/AMcast.pdf.

Office Action in European Application No. 13 756 736.8 dated Aug. 13, 2018. (All references not cited herewith have been previously made of record.).

Srinivasan, Vijay; "CS656 Distributed Systems Final Project—a Distributed Pub-Sub Based Middleware Service for Configuring Multicast Areas in a Sensor Network"; Retrieved from the internet: [URL:http://www.cs.virginia.edu/~vs8h/AMcast.pdf] retrieved on May 7, 2014; XP055116797; May 10, 2005; 21 pages.

* cited by examiner

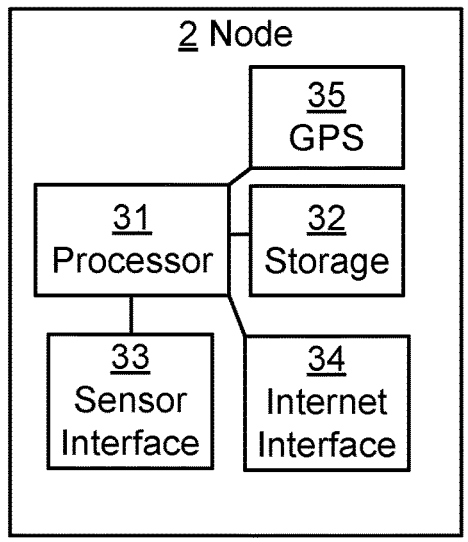
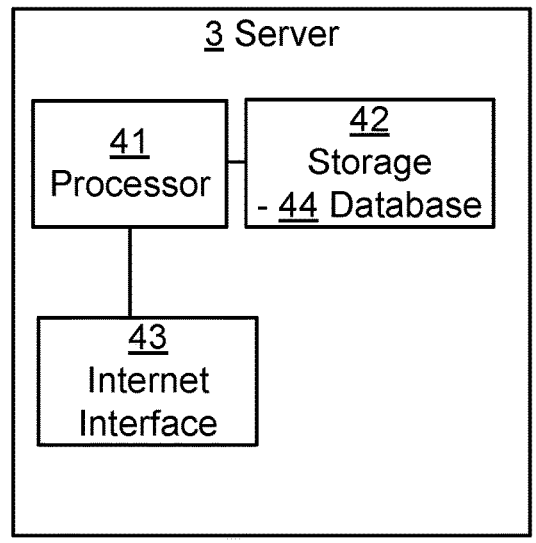
Fig. 3
Fig. 4
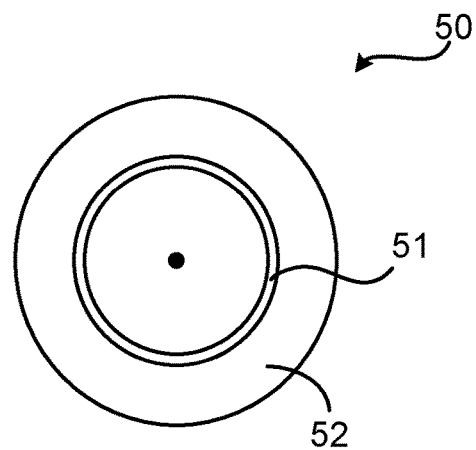
Fig. 5

COMMUNICATION NETWORK NODE

TECHNICAL FIELD

The present disclosure relates to a communication network node, and to a method performed by such a node, able to upload location specific data to a server.

BACKGROUND

The Internet of Things (IoT) envisions a fully networked world with billions of interconnected devices. This will lead to a dramatic paradigm shift in the networking world, since Machine-to-Machine (M2M) communications will be several orders of magnitude greater than the Human-to-Human or Human-to-Machine communications which is dominating today.

In this scenario, it would often be convenient for a device to be able to locate and communicate with its physically neighbouring devices. In addition, due to the sheer number of devices, self-properties (self-configuration, self-healing, self-management etc.) will be needed.

In this sense, it is convenient to modify the global communication domain (agnostic to location) to provide more localized information. For instance, mapping databases to geographical areas would lower the burden of maintaining global databases. Databases such as distributed hash tables (DHTs), publish-subscribe (pub/sub) networks and location-based services already exist separately and are known.

GaiaSup (http://gaiasup.com) provides an engine to "help developers to easily build location-based services (LBS) or geo/spatial applications" using pub/sub for spatial data. GaiaSup aggregates the location of multiple devices, in order to create a better positioning system.

The thesis "A distributed pub-sub based middleware service for configuring multicast areas in a sensor network" by Vijay Srinivasan dated May 10, 2005, University of Virginia (http://www.cs.virginia.edu/~vs8h/AMcast.pdf) deals with distribution and pub/sub in sensor networks. The paper is focused on local, homogeneous, mostly mica2 motes, sensor networks. The thesis uses pub/sub within the sensor network and relative X,Y coordinates for the devices.

SUMMARY

It is an objective of the present disclosure to provide improved inter-node communication of position specific information in a communication network.

According to an aspect of the present invention, there is provided a method performed in a node comprised in a communication network. The method comprises obtaining a set of coordinates of a coordinate system used by the communication network, which set of coordinates specifies a geographical position held by the node. The method also comprises obtaining a first identifier for the node. The identifier comprises at least a part of the obtained set of coordinates such that the identifier can specify to the communication network a first geographical area in which the node is positioned. The method also comprises uploading data to a server comprised in the communication network, said data being associated with the obtained identifier when uploaded to the server. The first identifier can thus specify to the network, such as other nodes in the communication network, a geographical area in which the node is positioned/located. The geographical area may be of any size, but includes the place where the node is positioned.

According to another aspect of the present disclosure, there is provided a computer program product comprising computer-executable components for causing a node comprised in a communication network to perform an embodiment of the method of the present disclosure when the computer-executable components are run on processor circuitry comprised in the node.

According to another aspect of the present disclosure, there is provided a node comprised in a communication network. The node comprises processor circuitry, and a storage unit storing instructions that, when executed by the processor circuitry, cause the node to obtain a set of coordinates of a coordinate system used by the communication network, which set of coordinates specifies a geographical position held by the node. The instructions also cause the node to obtain a first identifier for the node. The identifier comprises at least a part of the obtained set of coordinates such that the identifier can specify to the communication network a first geographical area in which the node is positioned. The instructions also cause the node to upload data to a server comprised in the communication network, said data being associated with the obtained identifier when uploaded to the server.

According to another aspect of the present disclosure, there is provided a computer program comprising computer program code which is able to, when run on processor circuitry in a node comprised in a communication network, cause the node to obtain a set of coordinates of a coordinate system used by the communication network, which set of coordinates specifies a geographical position held by the node. The code is also able to cause the node to obtain a first identifier for the node. The identifier comprises at least a part of the obtained set of coordinates such that the identifier can specify to the communication network a first geographical area in which the node is positioned. The code is also able to cause the node to upload data to a server comprised in the communication network, said data being associated with the obtained identifier when uploaded to the server.

According to another aspect of the present disclosure, there is provided a computer program product comprising an embodiment of a computer program of the present disclosure, and a computer readable means on which the computer program is stored.

By obtaining an identifier comprising a part of the coordinates (typically the same characters forming the coordinates), and then uploading it together with and associated with the data to the server, the data in the server may easily be identified by another node accessing the server as relating to a specific geographical area by studying the identifier with which the data is associated. No translation may be needed since the identifier is (at least partly) directly made up of the coordinates of the position held by the node which uploaded the data. Since the coordinates relate to a coordinate system used by the communication network, e.g. Global Positioning System (GPS) coordinates, other nodes in the communication system which are accessing the data in the server may directly know which area is specified by the coordinates in the identifier. By means of the embodiments of the present disclosure, nodes in a communication system may thus be enabled to easily and automatically upload and access, respectively, data associated with a geographical area covered by the communication system.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3 is a schematic block diagram of an embodiment of a node according to the present disclosure.

FIG. 4 is a schematic block diagram of an embodiment of a server in accordance with the present disclosure.

FIG. 5 is a schematic illustration of an embodiment of a computer program product according to the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
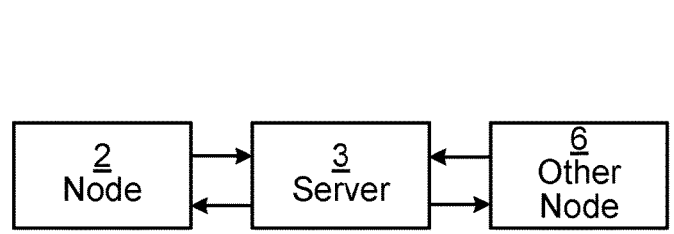
FIG. 1 is a schematic block diagram of a communication system in accordance with the present disclosure.

FIG. 1 schematically illustrates a communication network 1 in accordance with the present disclosure. A node 2 of the network 1 is in communication with a server 3. As discussed herein, the server 3 may e.g. hold at least a part of a database such as a DHT and/or a pub/sub network (also called a pub/sub system, or pub-sub system). In accordance with the present application, the node 2 can upload data to the server 3, and may also be able to retrieve data from said server 3, or from another server which also holds a part of the database. Similarly, other node(s) 6 of the communication network 1 may be able to upload/publish data to and/or retrieve/subscribe data from the server 3 or another server holding part of the database.

Figure 2:
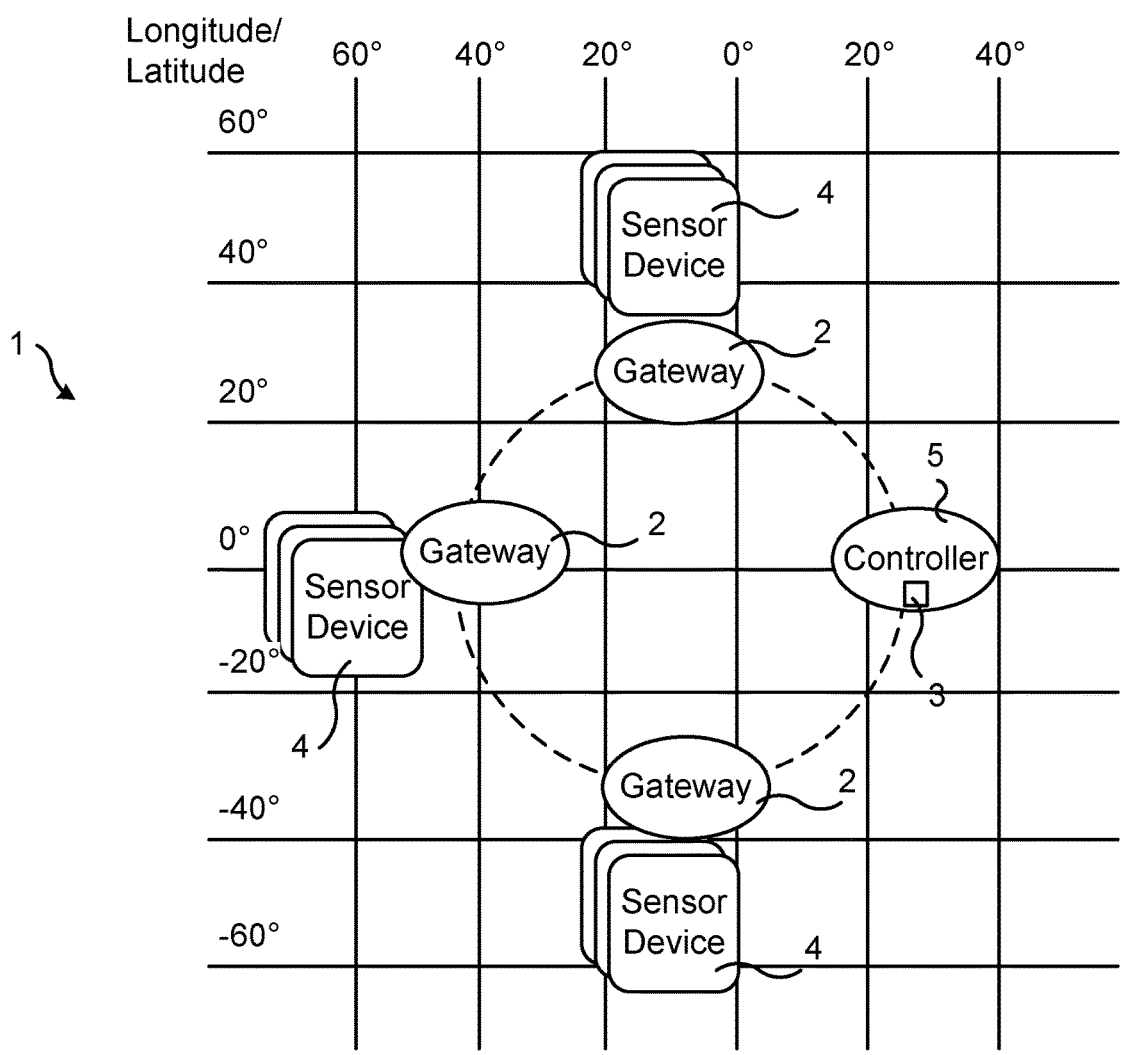
FIG. 2 is a schematic block diagram of another communication system in accordance with the present disclosure.

FIG. 2 schematically illustrates another embodiment of a communication network 1 of the present disclosure. The figure shows an overall architecture in a machine-to-machine (M2M) scenario. Sensor devices 4 and a controller 5 are connected to a DHT held in a server 3 which may or may not be part of the controller 5. The controller 5 may e.g. reside in the operator's network. There are several nodes 2 in the form of Gateways (GW) connected locally to a network of the sensors 4. The GWs 2 are also connected to a pub/sub network for publishing and subscribing to topics. In addition, the GWs 2 may know their own GPS coordinates and can use this information for creating the first identifiers in the form of a KEY ID in the DHT or as a publish ID (topic ID) in the pub/sub network. Thus, the GWs 2 can upload data relating to itself or obtained from the sensors 4 in its sensor network to the server 3 and thus to the DHT or pub/sub network, using its coordinates or parts of its coordinates as identifier for the data.

FIG. 3 schematically illustrates an embodiment of a node 2 in or for the communication network 1 of the present disclosure. The node 2 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software stored in a storage unit 32 e.g. a memory. The storage unit is regarded as a computer readable means and may e.g. be in the form of a Random Access Memory (RAM), a Flash memory or other solid state memory, or a hard disk. The processor circuitry 31 is also configured to store data in the storage unit 32, as needed. The node 2 further comprises at least one communication interface 34, e.g. an Internet interface, allowing the node to communicate with and upload data to the server 3. The communication interface 34 may be wired or wireless, e.g. using a cellular radio communication protocol. In case the node 2 acts as a GW, as e.g. in the embodiment of FIG. 2, the node 2 also comprises a second communication interface 33 for communication with the nodes e.g. sensors 4 for which it acts as a GW, here called a sensor interface 33. The sensor interface 33 may be integrated with the Internet interface 34 or may be separate therefrom. The node 2 may also comprise its own positioning unit 35, e.g. a GPS unit, for obtaining the set of coordinates specifying its geographical position. Alternatively, if e.g. the node 2 is stationary, its coordinates may be preprogrammed in the node 2 e.g. in its storage unit 32. The node 2 may e.g. be a radio device, with a wireless communication interface 34, such as any device or user equipment (UE), mobile or stationary, enabled to communicate over a radio cannel in a communications network, for instance but not limited to e.g. mobile phone, smart phone, modem, gateway, sensors, meters, vehicles, household appliances, medical appliances, media players, cameras, or any type of consumer electronic, for instance but not limited to television, radio, lighting arrangements, tablet computer, laptop, or personal computer (PC).

FIG. 4 schematically illustrates an embodiment of a server 3 in or for the communication network 1 of the present disclosure. The server 3 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software stored in a storage unit 42 e.g. a memory. The storage unit is regarded as a computer readable means and may e.g. be in the form of a Random Access Memory (RAM), a Flash memory or other solid state memory, or a hard disk. The server 3 also holds at least a part of a database 44, typically in its storage unit 42. As discussed herein, the database 44 may e.g. be a DHT or a pub/sub network configured for receiving data uploaded from a node 2 together with the first identifier. The processor circuitry 31 may also be configured to store data in the storage unit 32, as needed. The server 3 further comprises at least one communication interface 43, e.g. an Internet interface, allowing the server to communicate with and receive data from the node 2, and any other node 6 of the communication network 1. The communication interface 43 may be wired or wireless, e.g. using a cellular radio communication protocol. The server 3 may e.g. be a central server or one of several distributed and dedicated servers in the communication network 1, or the server 3 may be another node or peer 6 which is similar to the node 2 which uploads the data.

FIG. 5 illustrates a computer program product 50. The computer program product 50 comprises a computer readable medium 52 comprising a computer program 51 in the form of computer-executable components 51. The computer program/computer-executable components 51 may be configured to cause a node 2 of the communication network 1, e.g. as discussed above, to perform an embodiment of the method of the present disclosure. The computer program/computer-executable components may be run on the processor circuitry 31 of the node 2 for causing the node to perform the method. The computer program product 50 may e.g. be comprised in a storage unit or memory 32 comprised in the node 2 and associated with the processor circuitry 31. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

Figure 6:
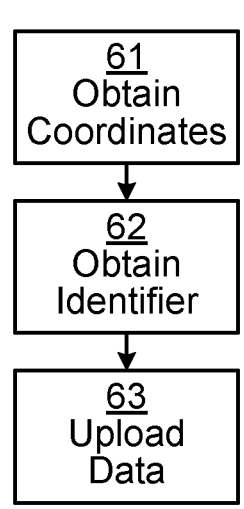
FIG. 6 is a schematic flow chart of an embodiment of a method according to the present disclosure.

FIG. 6 is a flow chart illustrating an embodiment of a method of the present disclosure.

A set of coordinates of a coordinate system used by the communication network 1 is obtained 61. The set of coordinates specifies a geographical position held by the node 2. The set of coordinates may e.g. be obtained by means of a positioning unit 35 as discussed in relation to FIG. 3, or it may e.g. be preprogrammed in the node 2 or received from elsewhere in the communication network 1. As an example herein, GPS coordinates may be used.

Further, a first identifier for the node 2 is obtained 62. The identifier comprises at least a part of the obtained 61 set of coordinates such that the identifier can specify to the communication network 1 a first geographical area in which the node 2 is positioned. At least a part of the series of characters forming each of the coordinates may thus also form at least part of the first identifier. Thus, the identifier may specify a geographical area in which the node 2 is positioned. The size of that area may be determined by how many of the characters (e.g. decimals) forming each coordinate is used in the identifier. If e.g. the set of coordinates consists of two coordinates each being a number having ten digits, an identifier using all ten digits of both coordinates will specify a much smaller area than an identifier using only the first 8 digits of each coordinate. Similarly, if the coordinates are obtained with a certain number of decimals, e.g. eight decimals, an identifier using all eight decimals of both coordinates will specify a much smaller area than an identifier using only the first five decimals of each coordinate. The obtaining 62 a first identifier may comprise the node 1 creating the identifier based on the obtained 61 set of coordinates. Alternatively, the node 2 may be given the identifier from elsewhere in the communication network 1 e.g. from a controller 5 which has first received the obtained 61 set of coordinates. In some embodiments, the first identifier may comprise different number of digits from the different coordinates of the set of coordinates (e.g. the first five digits of one coordinate and the first six digits of another coordinate), and in some embodiments the first identifier may comprise digits from only one of the coordinates.

Then, data is uploaded 63 to the server 3 comprised in the communication network 1. The data is associated with the obtained 62 identifier when uploaded to the server 3. This enables the data to be stored in the database 44 of the server 3 together with its associated identifier, allowing another node 6 to later retrieve the data which is specific for the area in which the uploading node 2 is located.

Figure 7:
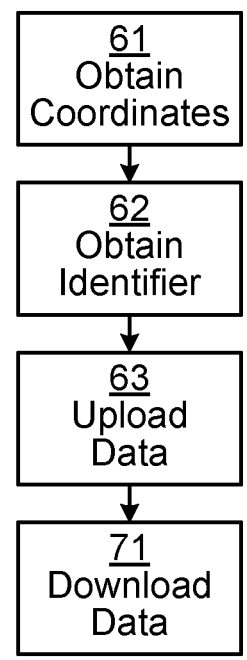
FIG. 7 is a schematic flow chart of another embodiment of a method according to the present disclosure.

FIG. 7 is a flow chart illustrating another embodiment of a method of the present disclosure. The embodiment comprises the steps of obtaining 61 a set of coordinates and obtaining 62 a first identifier, as well as the step of uploading 63 data to a server 3 in accordance with the discussion in relation to FIG. 6. The embodiment of FIG. 7 also comprises downloading 71 data from the server 3, wherein the data relates to a second geographical area. This is achieved by means of using a second identifier, constructed in the same way as the first identifier but specifying the second geographical area. The second identifier is used for identifying the data in the server 3 which is associated with an identifier specifying a geographical area comprised in or overlapping with said second geographical area. For instance, in analogy with the discussion in respect of FIG. 6, the node 2 may use a second identifier having five decimals of each of a set of coordinates specifying an area of interest. By means of the second identifier, the node 2 may find, in or via the database of the server 3, data associated with an identifier having the same five decimal coordinates. However, the node 2 may also find data associated with any identifier having more than five decimals of the coordinates as long as the five first decimals are the same as in the second identifier. Thus, all data in the database relating to an area comprised in the area of interest may be found by means of the second identifier. In some embodiments, the second identifier may comprise different number of digits of the different coordinates of the set of coordinates (e.g. the first five digits of one coordinate and the first six digits of another coordinate), and in some embodiments the second identifier may comprise digits from only one of the coordinates. The second area (i.e. the area of interest, may e.g. encompass the position of the node 2, or it may be a remote area which it for some reason is interested in).

In some embodiments of the present disclosure, the first identifier is a key to a distributed hash table (DHT) database 44 in the server 3, to which DHT the data is uploaded 63.

In some embodiments of the present disclosure, the first identifier is a subscription topic identifier for a publish-subscribe (pub/sub) network database 44 in the server 3, to which pub/sub network the data is uploaded 63.

In some embodiments of the present disclosure, the coordinate system is a Cartesian coordinate system in accordance with the World Geodetic System. The set of coordinates thus typically consists of two coordinates, one Y coordinate and one X coordinate.

In some embodiments of the present disclosure, the coordinate system is given by a satellite navigation system, such as a global navigation satellite system, GNSS; e.g. the Global Positioning System, GPS; the Global Navigation Satellite System, GLONASS; the Beidou Navigation Satellite System, BDS; the Indian Regional Navigational Satellite System, IRNSS; or the Galileo GNSS. Additionally or alternatively, triangulation, cell ID or the like in a cellular radio communication system may be used for obtaining the set of coordinates.

In some embodiments of the present disclosure, the obtaining 61 a set of coordinates comprises obtaining GPS coordinates by means of a GPS unit 35 comprised in the node 2.

In some embodiments of the present disclosure, the set of coordinates comprises a first coordinate and a second coordinate, each of which coordinates consists of a number of characters (e.g. digits), the first identifier being constructed to comprise the same first number of characters from each of the first and second coordinates. As discussed above, if e.g. each coordinate is a number, the first identifier includes the first e.g. five digits of the first coordinate and the first five digits of the second coordinate. Alternatively, the same number of decimals are used, e.g. the digits of the number forming each of the coordinates up to and including the first three decimals. Herein, any "+" or "−" signs, dots, commas, spaces or the like may or may not be regarded as characters in this regard.

In some embodiments of the present disclosure, the second geographical area is constructed by the node 2 from a plurality of subareas 102 which are combined to form the second geographical area 101, and the second identifier is constructed by the node 2 such that it specifies the constructed second geographical area. This could be called a dynamic area, where the node 2 is not strictly limited to square areas formed by the grid of the coordinate system. For instance, if the node 2 wants to find data relating to there area in which it is located, it may use its coordinates with a suitable number of digits or decimals as discussed above. However, the resulting specified area may be defined such that the node is close to an edge or even a corner in the specified area (grid square), why the node may be more interested in data relating to parts of neighbouring grid squares than data relating to far away parts of its own grid square. The node 2 may then first define subareas 102 in both its own grid square and the neighbouring square(s) of interest by using one or even two more digits or decimals from the coordinates in its area of interest. The node 2 may then use a second identifier specifying the subareas 102 forming the area of interest. See also example below.

In some embodiments of the present disclosure, the communication network 1 is a Machine-to-Machine (M2M) network and the node 2 is a gateway connecting machines e.g. sensors 4 in the M2M network to the Internet, or the node 2 is a bootstrapping node.

In some embodiments of the present disclosure, the node 2 is a mobile node and the obtaining 61 a set of coordinates comprises periodically updating the set of coordinates, and the obtaining 62 a first identifier comprises updating the first identifier based on the updated set of coordinates. If the node 2 is mobile, it will continuously or periodically check its coordinates in order to use an accurate first identifier for the data it is uploading to the server 3.

EXAMPLE 1

Figure 8:
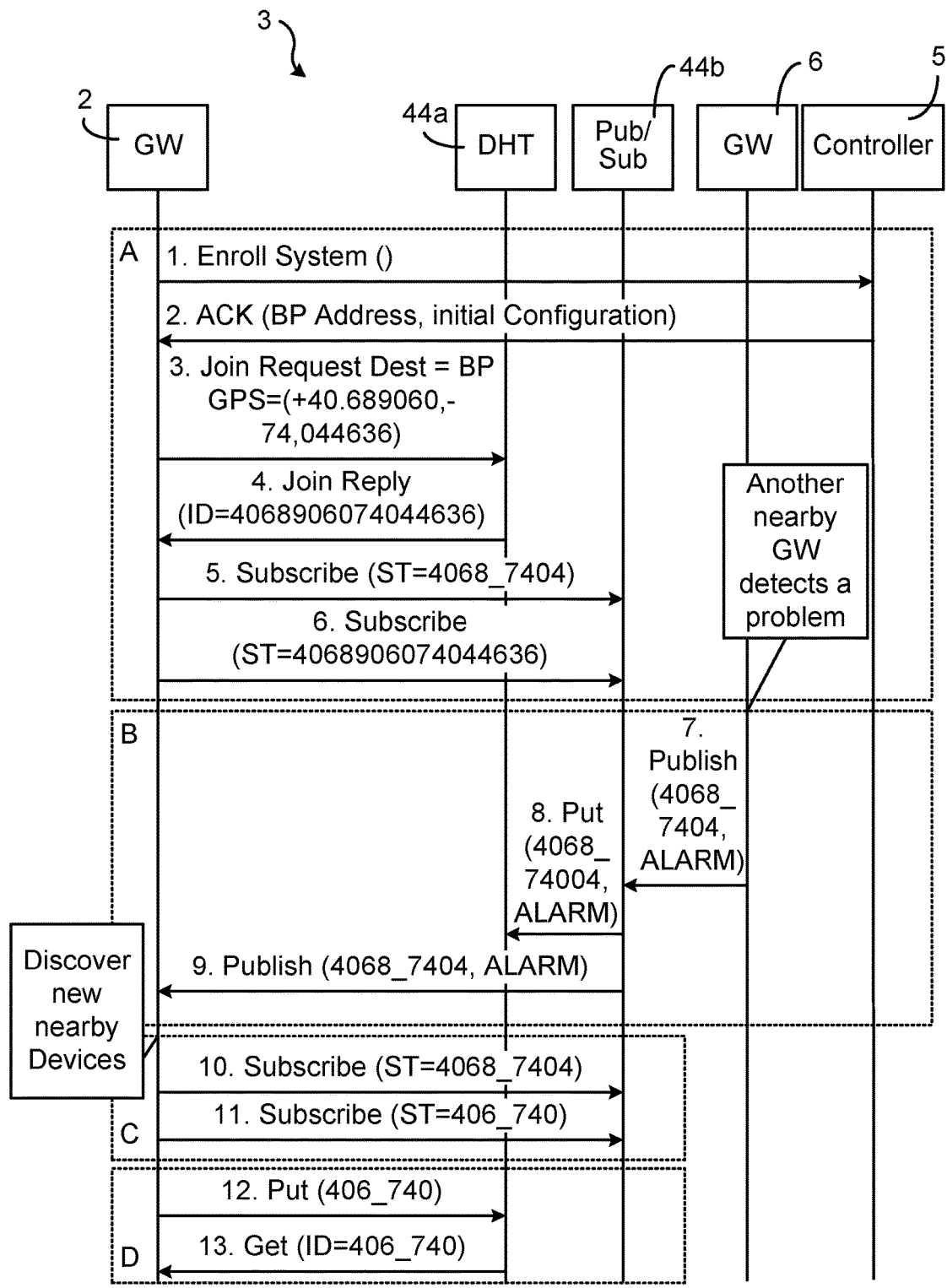
FIG. 8 is a schematic signalling diagram of an embodiment of an example method according to the present disclosure.

FIG. 8 is a schematic signalling diagram over signalling that may occur in a communication network 1, in accordance with the present disclosure. Shown are a node 2 in the form of a GW 2, a server 3 holding a database comprising a DHT 44a as well as a database holding a pub/sub 44b, another node 6 in the form of a second GW 6, and a controller 5.

Box A shows signalling for the GW 2 to join the DHT 44a and the pub/sub system 44b in a M2M scenario. Signal 1 is an Enrol System message from the node 2 to the controller 5. The GW 2 thus attaches to the network (e.g. 3GPP attach, Enrolment, Server, DHCP) via the controller 5. Signal 2 is an acknowledgement (ACK) from the controller 5 to the node 2. The controller 5 replies with the network location of the Bootstrap Peer (BP) and some device configuration information (e.g. DHT server 3 configuration, Pub/Sub server configuration). Signal 3 is a Join Request from the node 2 to the DHT 44a including the node's GPS coordinates (+40.689060, −74.044636). For instance, the GW 2 connects to the BP and sends a join request message along with its GPS coordinates. GPS coordinates may be defined by the latitude and longitude. As an example location, we use (+40.689060, −74.044636), whereby the location is represented by an integer, followed by six decimal values. Signal 4 is a Join Reply from the DHT 44a to the node 2 comprising the first identifier (4068906074044636) constructed from the coordinates and with which data uploaded 63 from the node 2 will be associated with as a KEY in the DHT 44a. According to this example, this is how the node 2 obtains 62 the first identifier. In signal 5, the node/GW 2 subscribes to a Subscription Topic (ST) or publishes a new ST into the Pub/Sub system 44b, based on its GPS coordinates and a location-to-area mapping algorithm. This Pub/Sub system may alternatively be part of the DHT 44a. For example, we take the latitude and longitude values with different decimal precision, in order to define a larger or smaller area around the GW 2. That is, the less decimals in the GPS coordinates, the wider the area and vice versa. In this case the subscription topic is ST=4068_7404 and the action radius is equivalent to two decimals or four digits in GPS notation, i.e. (40.68, −74.04). In the case of the latitude, removing four decimals results in change of the width, making a square of a side of about 1.11 kilometers, from 40.68 to 40.689999, with one corner in (+40.680000, −74.040000). With signal 6, The GW 2 can also create its own subscription topic with the same ID as its DHT ID (the first identifier), that is: ST=4068906074044636. This subscription is useful when there is a monitoring and controlling entity, that has to send commands to the node 2, and the node is not moving very often. Those commands can now be sent as a publication to the pub/sub system 44b.

Box B relates to the publishing of an alarm. If another node 6 (GW2), e.g. located nearby (therefore subscribed to the same area), detects a problem or malfunction that may affect other devices, it will publish a message (signal 7) with the particular alarm topic, such as publish (4068_7404, ALARM_FIRE). By signal 8, the Pub/Sub system 44b can store the alarm event in the DHT 44a, using a put operation. This may be done in order to gather publication history. The node 2 (GW 2) will in signal 9 download 71 the alert message from the pub/sub 44b, since it has subscribed to the same topic, based on its location information (see signal 5).

Box C relates to signalling for locating nearby nodes 6. An event that may occur for the node 2, is a discovery of its physically nearby nodes 6. In that event, the node will subscribe (signal 10) to topics applying the algorithm to its own DHT NodeID (the first identifier). In this case, the node 2 will subscribe to ever increasing topics, covering a wider search area. We call this as "progressive geographical neighbor discovery". Initially, it will try with a radius of few meters (ST=4068_7404). If the node does not find neighbours in the smaller area, it can expand the search area by a few hundred meters by using an ST in signal 11 with lower geographical precision (ST=406_740), thus indicating a larger geographical area.

Box D relates to signalling for storing geographically specific information in the DHT 44a. The node 2, in signal 12, uses a first identifier (406_740) for uploading 63 data to the DHT, which data is related to the area defined by the GPS coordinates 40.6 and 740.0. Thereby, the mechanism described here also supports storing data elements to the DHT, based on geographical location. The DHT operation is put( ). The data stored in the DHT is tied to the area. Thus, the node 2 or other nodes 6 joining that area, can retrieve the information by signal 13 using the first identifier (406_740) as KEY. The DHT operation is get( ).

EXAMPLE 2

Figure 9:
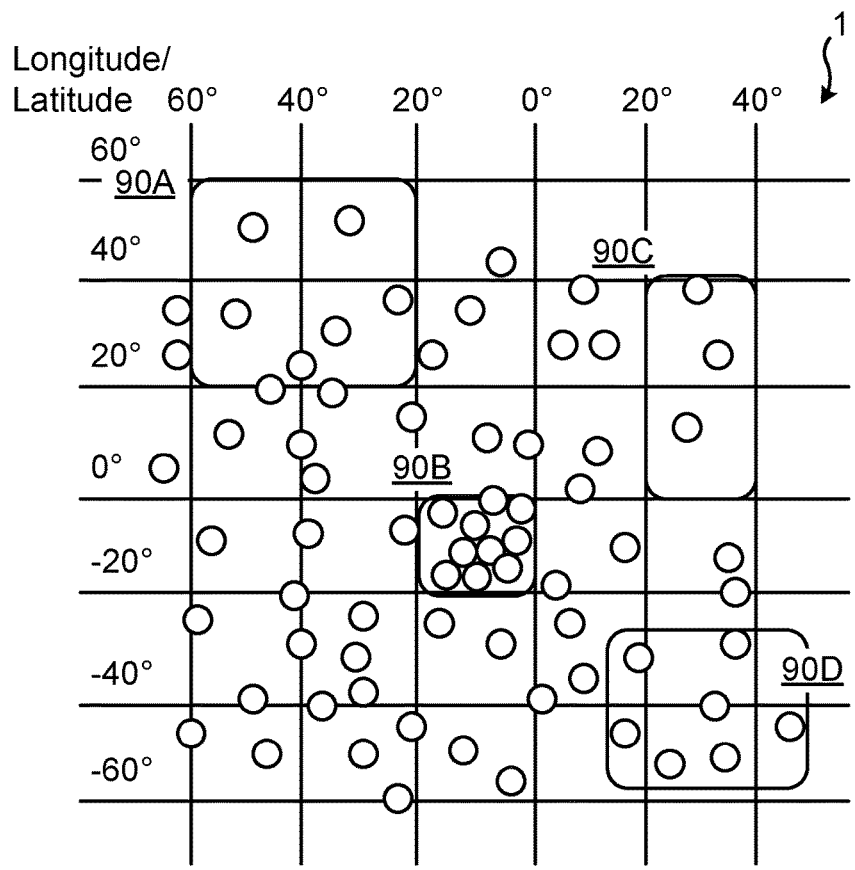
FIG. 9 is a schematic illustration of different geographical areas in a coordinate system, in accordance with an example of the present disclosure.

In FIG. 9 an urban scenario is illustrated with different pub/sub topic areas 90. The node 2 as well as many other nodes 6 (shown as dots in a geographical coordinate system overlaid on a city) is part of a large DHT 44. As is shown, the node density in the city varies from place to place, having more nodes (dots) in the centre than in the outskirts.

A node 2 in area 90A or 90D will be subscribed to a much wider area than a node 2 in area 90B or 90C. However, since the network 1 changes and as nodes join, leave or move from place to place, the areas will change accordingly, in order to adapt to optimize the geographical distribution of the nodes. Nodes may also subscribe to joint areas, as happens with area 90C.

Area 90D shows an example of dynamically created topic area. This area is composed of several sub-topic areas from different topic areas 90. This requires that the nodes are able to subscribe to an area of sub-topics. This is shown in more detail below.

Some of the nodes 2, 6 may be controller nodes 5, controlling the different areas covered by the network 1. They do not necessarily need to be physically located inside a topic area 90 it controls, but they should be in the DHT 44, in order to send commands via the pub/sub system 44b. For instance, they could send policies that apply only to those areas 90 and that are received by nodes located within the area 90 the controller node 5 controls.

EXAMPLE 3

Figure 10:
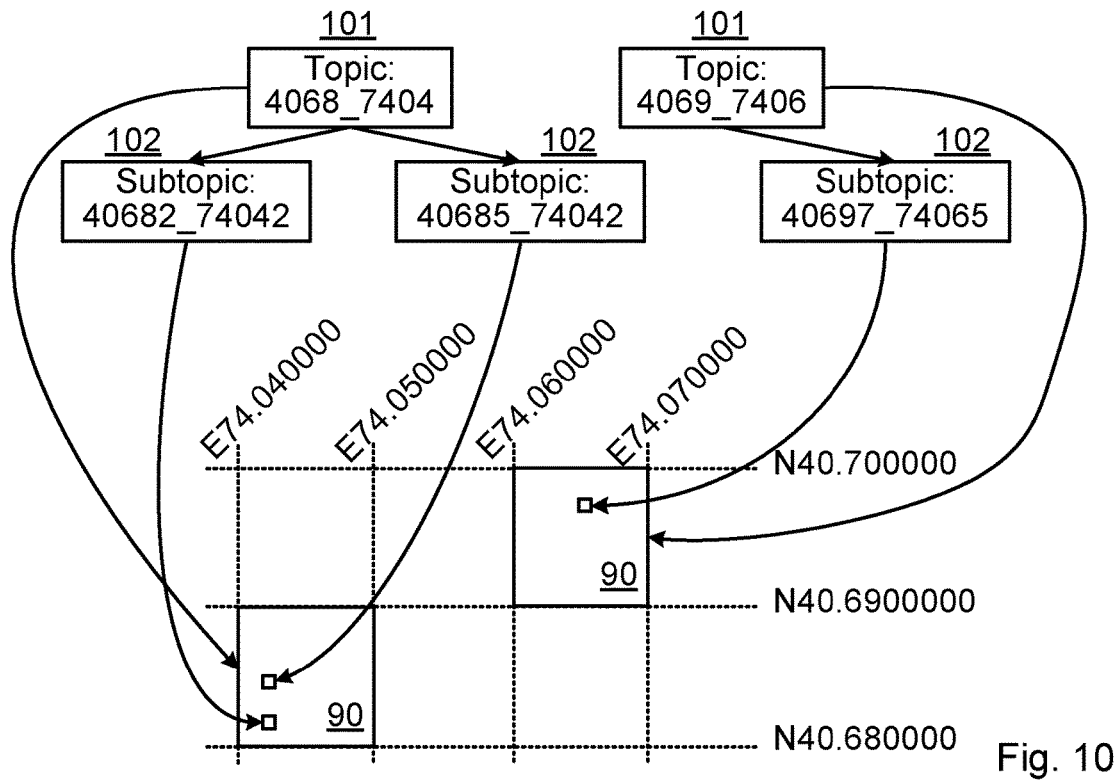
FIG. 10 is a schematic illustration of how geographical areas having different sizes may be formed in a coordinate system, in accordance with an example of the present disclosure.
Figure 11:
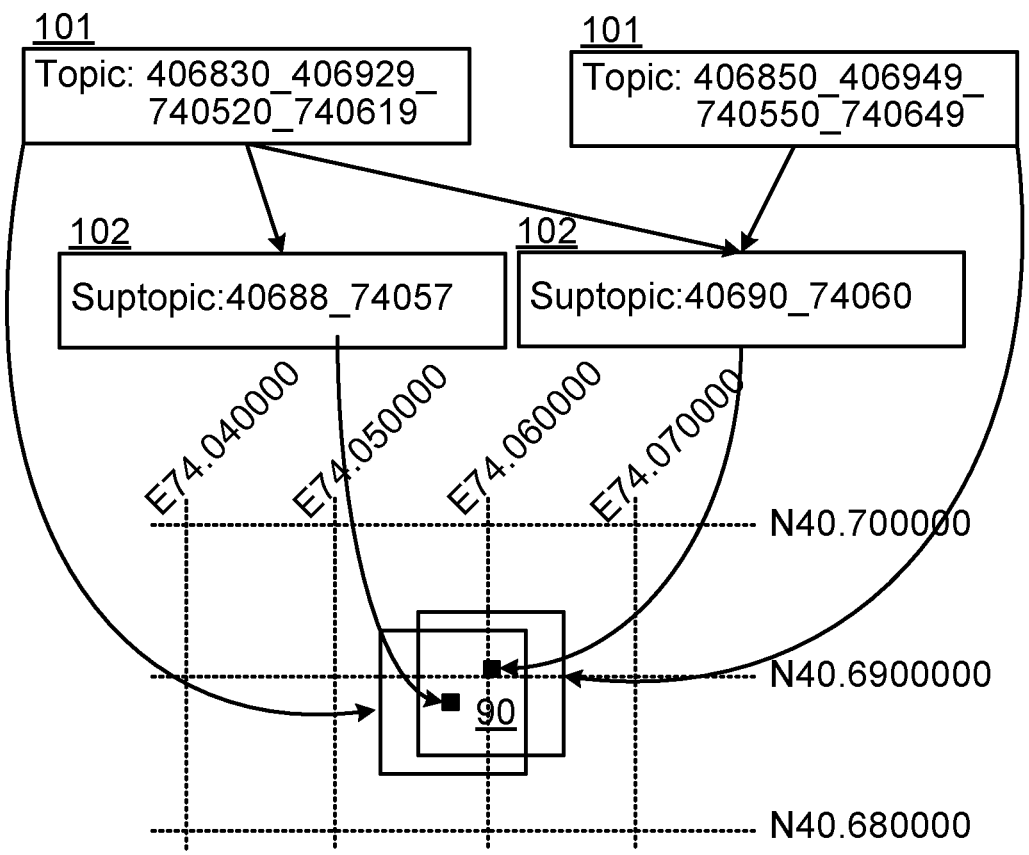
FIG. 11 is a schematic illustration of how dynamical geographical areas may be formed in a coordinate system, in accordance with an example of the present disclosure.

FIGS. 10 and 11 illustrate how topics and subtopics of a pub/sub 44b map to geographical areas 90. In order to optimize the topic publishing for nodes 2, 6 that are at the edge of an area (grid square) 90, the geographical pub/sub and DHT system is here better optimized. FIG. 10 shows two subtopics 102 (corresponding to subareas) that belong to the same topic 101 and topic area 90. The third subtopic 102 in the figure belongs to a different topic 101. Multiple nodes 2, 6 can reside in a subtopic area 102. FIG. 11 shows nodes 2, 6 that are in a subtopic area 102 that are close to the edge of the topic area 90 (corresponding to a topic 101). These nodes have created two new topic areas 90 that span over multiple topics 101 (i.e. includes subtopics 102 from multiple topics 101). Effectively this places the subtopic area in the centre of the new topic area 90. This may require new functionality from the DHT 44a and/or pub/sub system 44b that takes care of the subtopic mapping into the new topic area.

Embodiments of the present disclosure thus enables a node 2 to automatically find other nearby nodes 6 and perform adaptive operations. For instance, to configure itself to adapt to the device density in the area 90. E.g. if the area has a very sparse node population, the device can increase the energy output of its antenna. Conversely, the node can also subscribe to narrower areas, shrinking the area if it is very densely populated and avoiding overlapping with too many other nodes. This may also reduce the energy consumption. Once the node 2 knows its GPS position and its relative position to other nodes 6, it is useful to get new policies/alerts/commands from other nodes according to its configuration. Moreover, from the administrator's perspective, it is useful to set general rules or policies automatically to many nodes e.g. via the pub/sub 44b, without the need of configuring them manually, one by one.

Below follow some other aspects of the present disclosure.

According to an aspect of the present disclosure, there is provided a node 2 comprised in a communication network 1. The node comprises means (e.g. including the processor circuitry 31, possibly in cooperation with the GPS unit 35, of the node 2) for obtaining 61 a set of coordinates of a coordinate system used by the communication network 1, which set of coordinates specifies a geographical position held by the node 2. The node also comprises means (e.g. including the processor circuitry 31) for obtaining 62 a first identifier for the node 2, the identifier comprising at least a part of the obtained 61 set of coordinates such that the identifier can specify to the communication network 1 a first geographical area in which the node is positioned. The node 2 also comprises means (e.g. including the processor circuitry 31, possibly in cooperation with the internet interface 34) for uploading 63 data to a server 3 comprised in the communication network 1, said data being associated with the obtained identifier in the server 3.

According to another aspect of the present disclosure, there is provided a node 2 comprised in a communication network 1. The node comprises processor circuitry 31 configured for obtaining 61 a set of coordinates of a coordinate system used by the communication network 1, which set of coordinates specifies a geographical position held by the node 2. The node also comprises processor circuitry 31 configured for obtaining 62 a first identifier for the node 2, the identifier comprising at least a part of the obtained 61 set of coordinates such that the identifier can specify to the communication network 1 a first geographical area in which the node is positioned. The node 2 also comprises processor circuitry 31 configured for uploading 63 data to a server 3 comprised in the communication network 1, said data being associated with the obtained identifier in the server 3.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a node comprised in a communication network, the method comprising:

obtaining a set of coordinates of a coordinate system used by the communication network, which set of coordinates specifies a geographical position held by the node;

obtaining a first identifier for the node, the identifier comprising at least a part of the obtained set of coordinates such that the identifier can specify to the communication network a first geographical area in which the node is positioned;

uploading data to a server comprised in the communication network, said data being associated with the obtained identifier when uploaded to the server; and wherein the node is a mobile node and the obtaining a set of coordinates comprises periodically updating the set of coordinates, and the obtaining a first identifier comprises updating the first identifier based on the updated set of coordinates.

* * * * *